United States Patent
Tobisu et al.

(10) Patent No.: US 9,699,010 B2
(45) Date of Patent: Jul. 4, 2017

(54) WIRELESS COMMUNICATION APPARATUS

(71) Applicant: FUJITSU LIMITED, Kawasaki-shi, Kanagawa (JP)

(72) Inventors: Yusuke Tobisu, Yokohama (JP); Tadahiro Sato, Yokohama (JP); Hideyuki Kannari, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/159,207

(22) Filed: May 19, 2016

(65) Prior Publication Data
US 2017/0019279 A1 Jan. 19, 2017

(30) Foreign Application Priority Data
Jul. 16, 2015 (JP) .................. 2015-142469

(51) Int. Cl.
*H04W 72/08* (2009.01)
*H04L 27/00* (2006.01)
*H04L 27/26* (2006.01)
*H04B 1/04* (2006.01)

(52) U.S. Cl.
CPC ....... *H04L 27/0008* (2013.01); *H04B 1/0475* (2013.01); *H04L 27/2697* (2013.01); *H04B 2001/0416* (2013.01)

(58) Field of Classification Search
CPC ............ H04L 27/0008; H04L 27/2697; H04B 1/0475; H04B 2001/0416
See application file for complete search history.

(56) References Cited

U.S. PATENT DOCUMENTS

| | | |
|---|---|---|
| 2002/0013156 A1 | 1/2002 | Yamamoto et al. |
| 2003/0232600 A1 | 12/2003 | Montgomery et al. |
| 2009/0086863 A1 | 4/2009 | Komninakis et al. |
| 2010/0295533 A1 | 11/2010 | Kuga et al. |
| 2015/0171902 A1* | 6/2015 | Fleischer ............... H04B 1/525 375/285 |
| 2015/0257165 A1* | 9/2015 | Gale .................... H04B 1/1036 370/329 |
| 2015/0333784 A1* | 11/2015 | Bevan .................. H04B 1/1027 455/501 |
| 2016/0119662 A1* | 4/2016 | Zinevich ............ H04N 21/2385 725/95 |

FOREIGN PATENT DOCUMENTS

| | | |
|---|---|---|
| JP | 08-154015 | 6/1996 |
| JP | 2001-069075 | 3/2001 |
| JP | 2005-521326 | 7/2005 |
| JP | 2014-057327 | 3/2014 |
| WO | 2008/029522 | 3/2008 |

* cited by examiner

*Primary Examiner* — Dac Ha
(74) *Attorney, Agent, or Firm* — Fujitsu Patent Center

(57) ABSTRACT

A wireless communication apparatus includes a generating unit, a detecting unit, and a suppressing unit. The generating unit generates, using signals at multiple carrier frequencies that are different from each other, a replica signal for passive inter modulation distortion that occurs in a reception signal from a terminal due to the transmission of a multicarrier signal that includes the signals at the multiple carrier frequencies. The detecting unit detects the correlation value between the replica signal for the passive inter modulation distortion and the reception signal. The suppressing unit suppresses the peak of the multicarrier signal when the correlation value is equal to or more than the threshold.

8 Claims, 14 Drawing Sheets

WIRELESS COMMUNICATION APPARATUS

CROSS-REFERENCE TO RELATED APPLICATION

This application is based upon and claims the benefit of priority of the prior Japanese Patent Application No. 2015-142469, filed on Jul. 16, 2015, the entire contents of which are incorporated herein by reference.

FIELD

The embodiments discussed herein are related to a wireless communication apparatus.

BACKGROUND

When a base station of a wireless communication system transmits a multicarrier signal that includes signals at multiple different carrier frequencies, passive inter modulation distortion (hereafter, referred to as the "PIM" as appropriate) sometimes occurs in the signal that is received from a terminal. The PIM is one of the types of inter modulation distortion (hereafter, referred to as the "IM" as appropriate). For example, if the multicarrier signal, including the signal at a carrier frequency $f_1$ and the signal at a carrier frequency $f_2$, is transmitted, the signal that is received from the terminal sometimes includes third-order PIM. Hereafter, the signal at the carrier frequency $f_1$ is referred to as the "carrier signal 1", and the signal at the carrier frequency $f_2$ as the "carrier signal 2". In the case of transmission of the multicarrier signal that includes the carrier signal 1 and the carrier signal 2, third-order PIM occurs at the frequency of "$2f_1-f_2$" and the frequency of "$2f_2-f_1$" on the frequency axis.

The PIM interferes with the received signal; therefore, if the PIM occurs in the received signal, the signal-to-interference power ratio (SIR), which is one of the reception qualities of the base station, deteriorates. The base station uses the SIR to control the transmission power of the terminal. Therefore, it is important for the base station to know the level of the PIM with accuracy.

Furthermore, as the technique for knowing the level of the IM, there is a disclosed technique that uses signals at multiple carrier frequencies, included in the multicarrier signal, to generate a replica signal for the IM and detects the correlation value between the replica signal for the IM and the received signal as the level of the IM.

Japanese Laid-open Patent Publication No. 2014-57327

However, in the conventional technology, no consideration is given to prevention of degradation of the reception quality due to the passive inter modulation distortion.

Specifically, according to the conventional technology, the correlation value between the replica signal for the IM and the received signal is simply detected; therefore, if the correlation value increases and large IM occurs in the received signal, the SIR, which is one of the reception qualities of the base station, is degraded. Similarly, if the PIM, which is one of the types of IM, occurs in the received signal due to the transmission of a multicarrier signal, the SIR deteriorates. Degradation of the SIR is undesirable as it decreases the accuracy with which the base station controls the transmission power of the terminal and, as a result, it causes an increase in the power consumption of the terminal.

Therefore, it is expected to prevent degradation of the reception quality due to the passive inter modulation distortion.

SUMMARY

According to an aspect of an embodiment, a wireless communication apparatus includes a generating unit that generates, using signals at multiple carrier frequencies that are different from each other, a replica signal for passive inter modulation distortion that occurs in a reception signal from a terminal due to transmission of a multicarrier signal that includes the signals at the multiple carrier frequencies; a detecting unit that detects a correlation value between the replica signal for the passive inter modulation distortion and the reception signal; and a suppressing unit that suppresses a peak of the multicarrier signal when the correlation value is equal to or more than a threshold.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
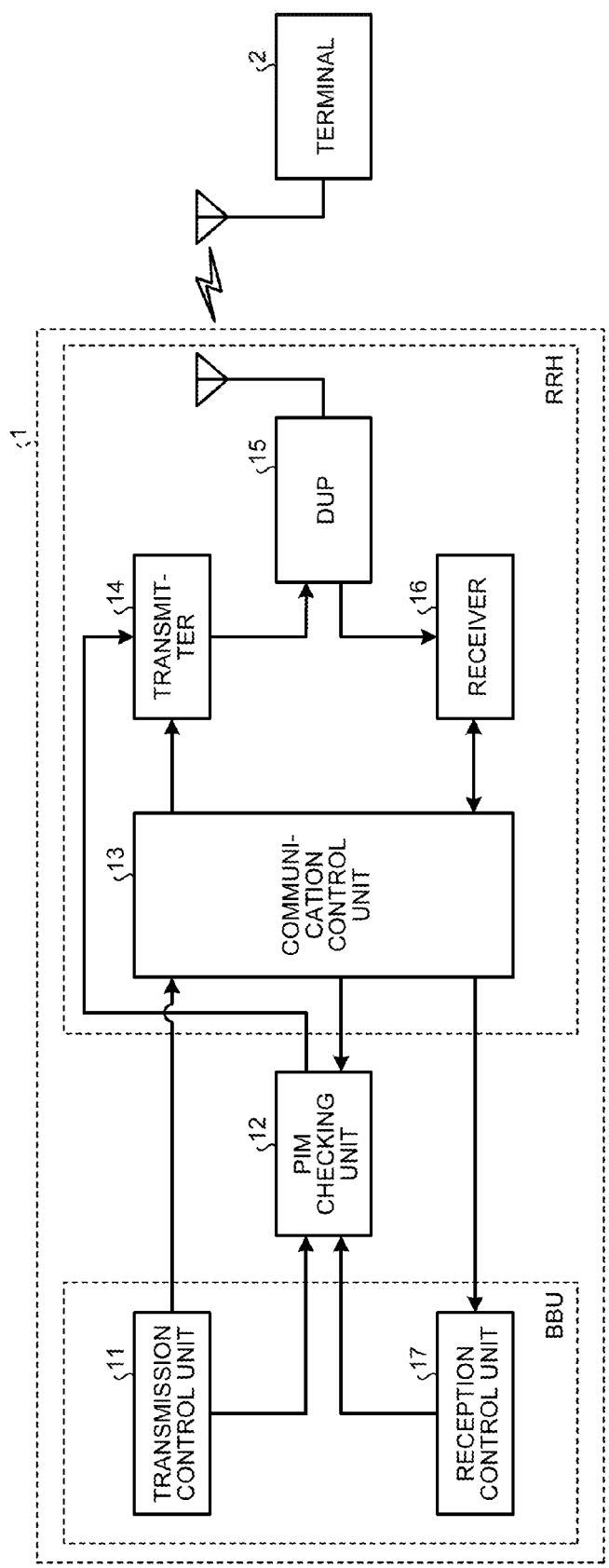
FIG. 1 is a block diagram that illustrates an example of the configuration of a wireless communication system according to a first embodiment.

Preferred embodiments of the present invention will be explained with reference to accompanying drawings. Here, the disclosed technology is not limited to the embodiments. Furthermore, the same reference numeral is applied to the components that have the same function in embodiments, and the duplicated explanations are omitted.

[a] First Embodiment

FIG. 1 is a block diagram that illustrates an example of the configuration of a wireless communication system according to a first embodiment. The wireless communication system, illustrated in FIG. 1, includes a base station 1 and a terminal 2.

The terminal 2 transmits and receives signals to and from the base station 1. The transmission power of the terminal 2 is controlled by the base station 1.

The base station 1 is a wireless communication apparatus that transmits, to the terminal 2, a multicarrier signal that includes signals at multiple different carrier frequencies. The base station 1 includes a transmission control unit 11, a PIM checking unit 12, a communication control unit 13, a transmitter 14, a duplexer 15, a receiver 16, and a reception control unit 17. Furthermore, the base station 1 may be configured by using two separate devices, i.e., a control device and a wireless device. In this case, for example, the transmission control unit 11 and the reception control unit 17 are housed in a base band unit (BBU), which is the control device, and the communication control unit 13, the transmitter 14, the duplexer 15, and the receiver 16 are housed in a remote radio head (RRH), which is the wireless device. The PIM checking unit 12 is provided between the BBU and the RRH.

The transmission control unit 11 determines the transmission power of the base station 1 and generates the baseband signal that has the amplitude that corresponds to the determined transmission power. Furthermore, the transmission control unit 11 multiplies the generated baseband signal by the carrier frequency to generate a carrier signal, and it outputs the generated carrier signal to the PIM checking unit 12 and the communication control unit 13. Here, as the carrier signal, the transmission control unit 11 generates the signal (i.e., the carrier signal 1) at the carrier frequency $f_1$ and the signal (i.e., the carrier signal 2) at the carrier frequency $f_2$. The carrier signal 1 and the carrier signal 2 are examples of the signals at multiple different carrier frequencies.

Furthermore, the transmission control unit 11 outputs the information that indicates the carrier frequency $f_1$ and the information that indicates the carrier frequency $f_2$ to the PIM checking unit 12.

The PIM checking unit 12 uses the carrier signal 1 and the carrier signal 2 to generate a replica signal (hereafter, referred to as the "PIM replica signal" as appropriate) for the PIM that occurs in a signal that is received from the terminal 2 due to the transmission of a multicarrier signal, including the carrier signal 1 and the carrier signal 2. Furthermore, the PIM checking unit 12 detects the correlation value between the PIM replica signal and the reception signal as the level of the PIM.

Figure 2:
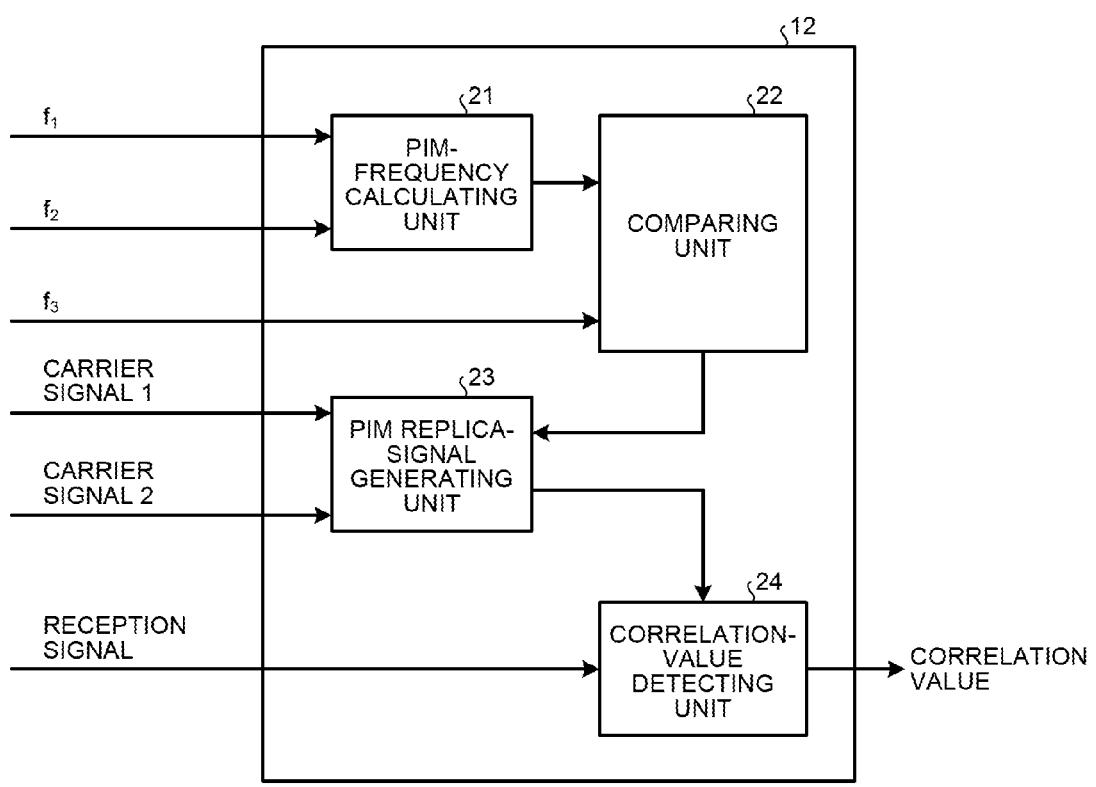
FIG. 2 is a block diagram that illustrates an example of the configuration of a PIM checking unit according to the first embodiment.

For example, as illustrated in FIG. 2, the PIM checking unit 12 includes a PIM-frequency calculating unit 21, a comparing unit 22, a PIM replica-signal generating unit 23, and a correlation-value detecting unit 24. FIG. 2 is a block diagram that illustrates an example of the configuration of the PIM checking unit according to the first embodiment.

The PIM-frequency calculating unit 21 uses the carrier frequency $f_1$ and the carrier frequency $f_2$, received from the transmission control unit 11, to calculate the frequency (hereinafter, referred to as the "PIM frequency" as appropriate) where third-order PIM occurs. The PIM frequency is the frequency of "$2f_1-f_2$" and the frequency of "$2f_2-f_1$". The PIM-frequency calculating unit 21 outputs the calculated PIM frequency to the comparing unit 22.

The comparing unit 22 compares the PIM frequency, received from the PIM-frequency calculating unit 21, and a reception frequency $f_3$, received from the reception control unit 17, to determine whether the PIM frequency and the reception frequency $f_3$ are overlapped, and it outputs the result of the determination to the PIM replica-signal generating unit 23. Here, the case where the PIM frequency and the reception frequency $f_3$ are overlapped includes not only a case where the PIM frequency and the reception frequency $f_3$ completely match but also a case where the interval between the PIM frequency and the reception frequency $f_3$ along the frequency axis is less than a predetermined value.

The PIM replica-signal generating unit 23 uses the carrier signal 1 and the carrier signal 2, received from the transmission control unit 11, to generate a PIM replica signal. Specifically, the PIM replica-signal generating unit 23 generates a PIM replica signal if the PIM frequency (the frequency of "$2f_1-f_2$" or the frequency of "$2f_2-f_1$") and the reception frequency $f_3$ are overlapped as the result of determination by the comparing unit 22. That is, the frequency of the PIM replica signal is the PIM frequency. The PIM replica-signal generating unit 23 is an example of a "generating unit".

Figure 3:
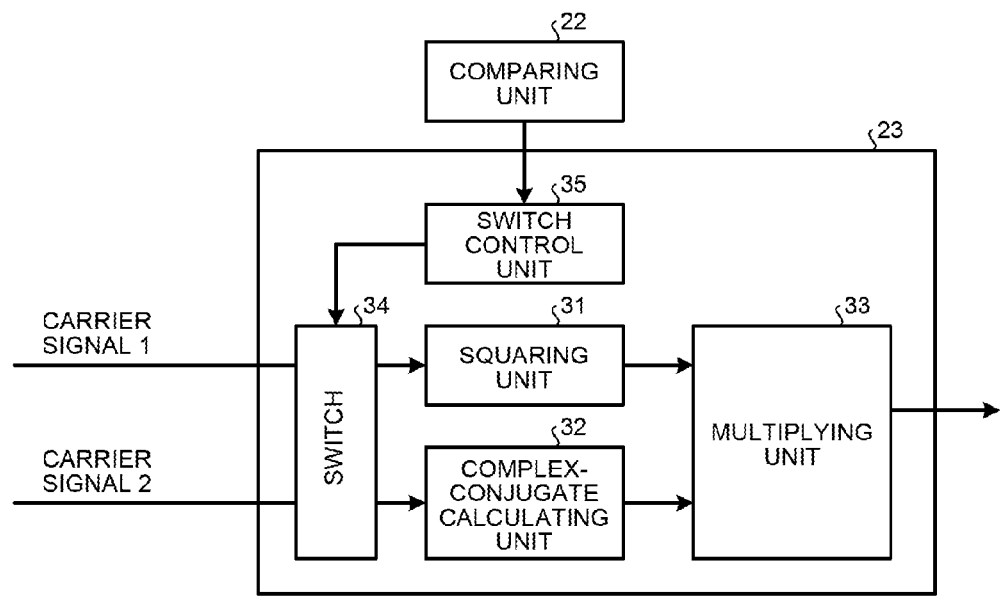
FIG. 3 is a block diagram that illustrates an example of a PIM replica-signal generating unit according to the first embodiment.

For example, as illustrated in FIG. 3, the PIM replica-signal generating unit 23 includes a squaring unit 31, a complex-conjugate calculating unit 32, a multiplying unit 33, a switch 34, and a switch control unit 35. FIG. 3 is a block diagram that illustrates an example of the PIM replica-signal generating unit according to the first embodiment.

The switch 34 switches the output pathway of the carrier signal 1 and the carrier signal 2, received from the transmission control unit 11, under the control of the switch control unit 35. Specifically, if the switch 34 receives a "first switch control signal" from the switch control unit 35, it outputs the carrier signal 1 to the squaring unit 31 and outputs the carrier signal 2 to the complex-conjugate calculating unit 32. Conversely, if the switch 34 receives a "second switch control signal" from the switch control unit 35, it outputs the carrier signal 1 to the complex-conjugate calculating unit 32 and outputs the carrier signal 2 to the squaring unit 31.

The switch control unit 35 controls a switchover of the switch 34 in accordance with the result of determination by the comparing unit 22. Specifically, if the frequency of "$2f_1-f_2$", which is the PIM frequency, and the reception frequency $f_3$ are overlapped as the result of determination by the comparing unit 22, the switch control unit 35 uses the above-described "first switch control signal" to control the switch 34 so as to output the carrier signal 1 to the squaring unit 31 and output the carrier signal 2 to the complex-conjugate calculating unit 32. Furthermore, if the frequency of "$2f_2-f_1$", which is the PIM frequency, and the reception frequency $f_3$ are overlapped, the switch control unit 35 uses the above-described "second switch control signal" to control the switch 34 so as to output the carrier signal 1 to the complex-conjugate calculating unit 32 and output the carrier signal 2 to the squaring unit 31. Moreover, if both the frequency of "$2f_1-f_2$" and the frequency of "$2f_2-f_1$" are overlapped with the reception frequency $f_3$, for example, the switch control unit 35 performs the following operation. First, the switch control unit 35 uses the above-described "first switch control signal" to control the switch 34 so as to output the carrier signal 1 to the squaring unit 31 and output the carrier signal 2 to the complex-conjugate calculating unit 32. Then, the switch control unit 35 uses the above-described "second switch control signal" to control the switch 34 so as to output the carrier signal 1 to the complex-conjugate calculating unit 32 and output the carrier signal 2 to the squaring unit 31.

The squaring unit 31 squares the carrier signal 1 or the carrier signal 2, received from the switch 34, and outputs the resultant squared signal to the multiplying unit 33.

The complex-conjugate calculating unit 32 determines the complex conjugate of the carrier signal 1 or the carrier signal 2, received from the switch 34, and outputs the resultant complex conjugate signal to the multiplying unit 33.

The multiplying unit 33 multiplies the squared signal, received from the squaring unit 31, by the complex conjugate signal, received from the complex-conjugate calculating unit 32, to generate a PIM replica signal.

With reference back to FIG. 2, the correlation-value detecting unit 24 detects the correlation value (hereafter, referred to as the "PIM correlation value" as appropriate) between the PIM replica signal, generated by the PIM replica-signal generating unit 23, and the reception signal, received from the communication control unit 13, and outputs the detected PIM correlation value to the transmitter 14. The correlation-value detecting unit 24 is an example of a "detecting unit".

With reference back to FIG. 1, the communication control unit 13 outputs the carrier signal 1 and the carrier signal 2, received from the transmission control unit 11, to the transmitter 14. Furthermore, the communication control unit 13 outputs the reception signal, received from the receiver 16, to the PIM checking unit 12 and the reception control unit 17.

The transmitter 14 combines the carrier signal 1 and the carrier signal 2, received from the communication control unit 13, conducts peak suppression on the combined signal, and outputs the signal, whose peak has been suppressed, to the duplexer 15. Thus, the signal that is output from the transmitter 14 is a multicarrier signal that includes the carrier signal 1 and the carrier signal 2. Furthermore, the signal that is output from the transmitter 14 is a multicarrier signal, whose peak has been suppressed.

Figure 4:
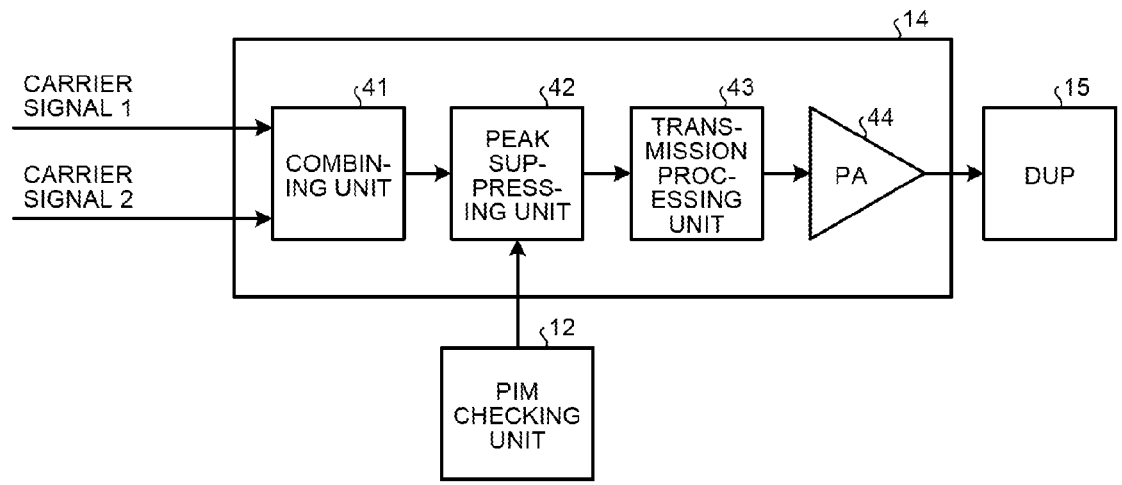
FIG. 4 is a block diagram that illustrates an example of the configuration of a transmitter according to the first embodiment.

For example, as illustrated in FIG. 4, the transmitter 14 includes a combining unit 41, a peak suppressing unit 42, a transmission processing unit 43, and an amplifier (power amplifier; hereafter, referred to as the "PA") 44. FIG. 4 is a block diagram that illustrates an example of the configuration of the transmitter according to the first embodiment.

The combining unit 41 combines the carrier signal 1 and the carrier signal 2 and outputs the resultant multicarrier signal to the peak suppressing unit 42.

The peak suppressing unit 42 determines whether the PIM correlation value, received from the PIM checking unit 12, is equal to or more than a predetermined threshold. Furthermore, if the PIM correlation value is equal to or more than the threshold, the peak suppressing unit 42 suppresses the peak of the multicarrier signal. Specifically, if the PIM correlation value is equal to or more than the threshold, the peak suppressing unit 42 gradually suppresses the peak of the multicarrier signal until the PIM correlation value becomes less than the threshold or until the value of the peak of the multicarrier signal, whose peak has been suppressed, reaches a predetermined lower limit value. Suppression of the peak of the multicarrier signal reduces the level of the PIM that occurs in the signal that is received from the terminal 2 due to the transmission of the multicarrier signal. Furthermore, the peak suppressing unit 42 may increase or decrease the suppression degree of the peak of the multicarrier signal in accordance with the PIM correlation value.

The transmission processing unit 43 performs predetermined wireless transmission processing (digital-analog conversion, up-conversion, or the like) on the multicarrier signal whose peak has been suppressed, and it outputs the multicarrier signal, on which the wireless transmission processing has been performed, to the PA 44.

The PA 44 amplifies the electric power of the multicarrier signal, received from the transmission processing unit 43, and outputs the multicarrier signal, whose electric power has been amplified, to the duplexer 15.

With reference back to FIG. 1, the duplexer 15 switches transmission and reception of signals via the antenna. Specifically, the duplexer 15 transmits the multicarrier signal, received from the transmitter 14, via the antenna and outputs the reception signal, received from the antenna, to the receiver 16.

The receiver 16 performs predetermined wireless reception processing (down-conversion, analog-digital conversion, or the like) on the reception signal that is received from the duplexer 15, and it outputs the reception signal, on which the wireless reception processing has been performed, to the communication control unit 13.

The reception control unit 17 determines that the reception frequency $f_3$ is the center frequency of a predetermined reception band for receiving a reception signal from the terminal 2, and it outputs the determined reception frequency $f_3$ to the PIM checking unit 12.

Furthermore, the reception control unit 17 uses the level of the reception signal, received from the communication control unit 13, and the PIM correlation value, i.e., the level of the PIM, detected by the PIM checking unit 12, to calculate SIR, which is one of the reception qualities of the base station 1. Furthermore, the reception control unit 17 uses the SIR to control the transmission power of the terminal 2. Thus, if the PIM correlation value increases and large PIM occurs in the reception signal, the SIR is deteriorated. Deterioration of the SIR decreases the accuracy with which the reception control unit 17 controls the transmission power of the terminal 2 and, as a result, it causes an increase in the power consumption of the terminal 2.

However, as described above, according to the present embodiment, if the PIM correlation value is equal to or more than the threshold, the peak suppressing unit 42 suppresses the peak of the multicarrier signal. This reduces the level of the PIM that occurs in the signal, received from the terminal 2, due to the transmission of the multicarrier signal. Thus, degradation of the SIR, caused by the PIM, is reduced. As a result, there is an improvement in the accuracy with which the reception control unit 17 controls the transmission power of the terminal 2, and therefore an increase in the power consumption of the terminal 2 is prevented.

Figure 5:
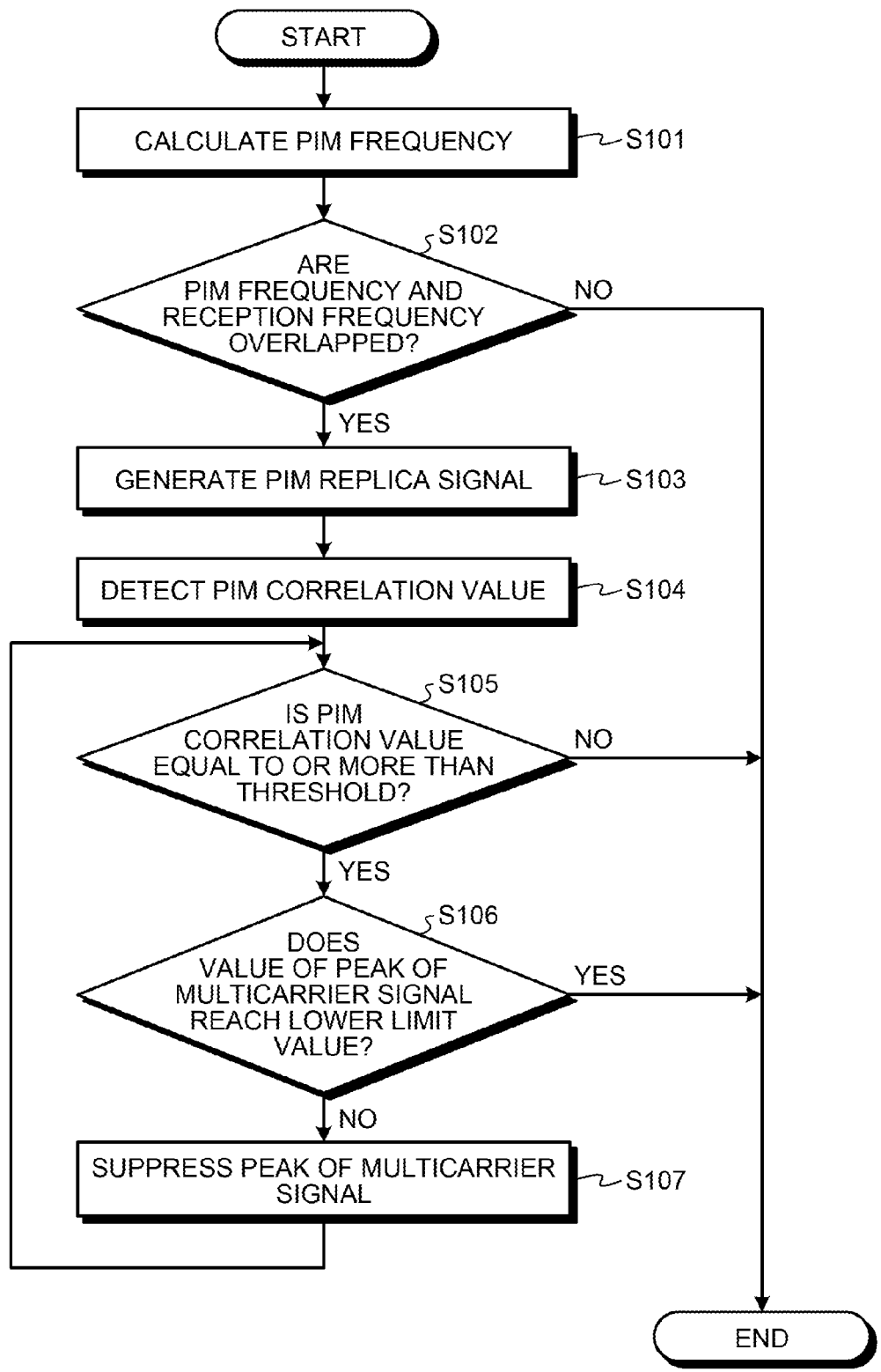
FIG. 5 is a flowchart that illustrates the processing procedure of a base station according to the first embodiment.

Next, an explanation is given of the processing procedure of the base station 1 according to the first embodiment. FIG. 5 is a flowchart that illustrates the processing procedure of the base station according to the first embodiment.

As illustrated in FIG. 5, the PIM-frequency calculating unit 21 of the PIM checking unit 12 calculates the PIM frequency (S101). The comparing unit 22 determines whether the PIM frequency and the reception frequency $f_3$ are overlapped (S102). If the PIM frequency and the reception frequency $f_3$ are not overlapped (No at S102), the comparing unit 22 terminates the operation.

If the PIM frequency and the reception frequency $f_3$ are overlapped (Yes at S102) as the result of the determination by the comparing unit 22, the PIM replica-signal generating unit 23 generates a PIM replica signal (S103).

The correlation-value detecting unit 24 detects the correlation value between the PIM replica signal and the reception signal, i.e., the PIM correlation value (S104).

The peak suppressing unit 42 of the transmitter 14 determines whether the PIM correlation value is equal to or more than the predetermined threshold (S105). If the PIM correlation value is less than the threshold (No at S105), the peak suppressing unit 42 terminates the operation.

If the PIM correlation value is equal to or more than the threshold (Yes at S105), the peak suppressing unit 42 determines whether the value of the peak of the multicarrier signal reaches the predetermined lower limit value (S106). If the value of the peak of the multicarrier signal reaches the predetermined lower limit value (Yes at S106), the peak suppressing unit 42 terminates the operation.

If the value of the peak of the multicarrier signal does not reach the predetermined lower limit value (No at S106), the peak suppressing unit 42 suppresses the peak of the multicarrier signal (S107), returns to the operation at Step S105, and repeats Steps S105 to S107. That is, if the PIM correlation value is equal to or more than the threshold, the peak suppressing unit 42 gradually suppresses the peak of the multicarrier signal until the PIM correlation value becomes less than the threshold or until the value of the peak of the multicarrier signal, whose peak has been suppressed, reaches the predetermined lower limit value.

As described above, according to the present embodiment, the base station 1 includes the PIM replica-signal generating unit 23, the correlation-value detecting unit 24, and the peak suppressing unit 42. The PIM replica-signal generating unit 23 uses signals at the carrier frequencies $f_1$ and $f_2$ to generate a replica signal for the PIM that occurs in the signal, received from the terminal 2, due to the transmission of the multicarrier signal that includes signals at the carrier frequencies $f_1$ and $f_2$. The correlation-value detecting unit 24 detects the PIM correlation value, which is the correlation value between the PIM replica signal and the reception signal. If the PIM correlation value is equal to or more than the threshold, the peak suppressing unit 42 suppresses the peak of the multicarrier signal.

With the configuration of the base station 1, as the level of the PIM, which occurs in the signal that is received from the terminal 2 due to the transmission of the multicarrier signal, is decreased, the degradation of SIR due to the PIM is reduced. As a result, there is an improvement in the accuracy with which the reception control unit 17 controls the transmission power of the terminal 2, and an increase in the power consumption of the terminal 2 is prevented.

[b] Second Embodiment

According to the second embodiment, if the PIM correlation value is equal to or more than the threshold, the carrier bandwidth of one of the signals at the two carrier frequencies $f_1$ and $f_2$, which are adjacent to each other in the multicarrier signal, is changed to a bandwidth that is narrower than the carrier bandwidth of the other one of the signals.

Figure 6:
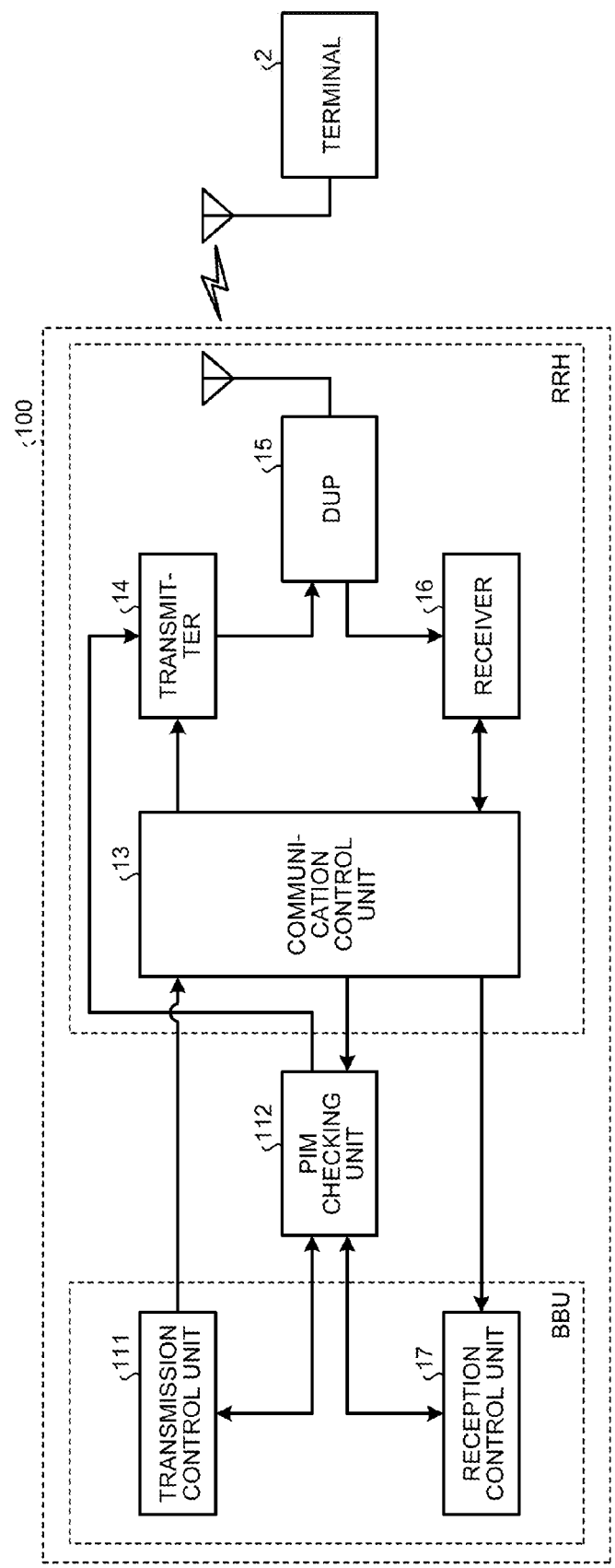
FIG. 6 is a block diagram that illustrates an example of the configuration of a wireless communication system according to a second embodiment.

FIG. 6 is a block diagram that illustrates an example of the configuration of a wireless communication system according to the second embodiment. In the wireless communication system, illustrated in FIG. 6, a base station 100 includes a PIM checking unit 112 instead of the PIM checking unit 12 that is illustrated in FIG. 1. Furthermore, the base station 100 includes a transmission control unit 111 instead of the transmission control unit 11 that is illustrated in FIG. 1.

The PIM checking unit 112 basically has the same function as that of the PIM checking unit 12 according to the first embodiment. Specifically, the PIM checking unit 112 includes the PIM-frequency calculating unit 21, the comparing unit 22, the PIM replica-signal generating unit 23, and the correlation-value detecting unit 24, illustrated in FIG. 2. Furthermore, the PIM-frequency calculating unit 21 outputs the calculated PIM frequency to the comparing unit 22 and the transmission control unit 111. Moreover, the correlation-value detecting unit 24 outputs the detected PIM correlation value to the transmitter 14 and the transmission control unit 111.

The transmission control unit 111 basically has the same function as that of the transmission control unit 11 according to the first embodiment. Furthermore, the transmission control unit 111 determines whether the PIM correlation value, received from the PIM checking unit 112, is equal to or more than the predetermined threshold. Then, if the PIM correlation value is equal to or more than the threshold, the transmission control unit 111 changes the carrier bandwidth of one of the carrier signals 1 and 2 to a bandwidth that is narrower than the carrier bandwidth of the other one of the signals. For example, the transmission control unit 111 changes the carrier bandwidth of the signal at the carrier frequency, which is closer to the PIM frequency among the carrier signals 1 and 2, to a bandwidth that is narrower than the carrier bandwidth of the other one of the signals.

Figure 7:
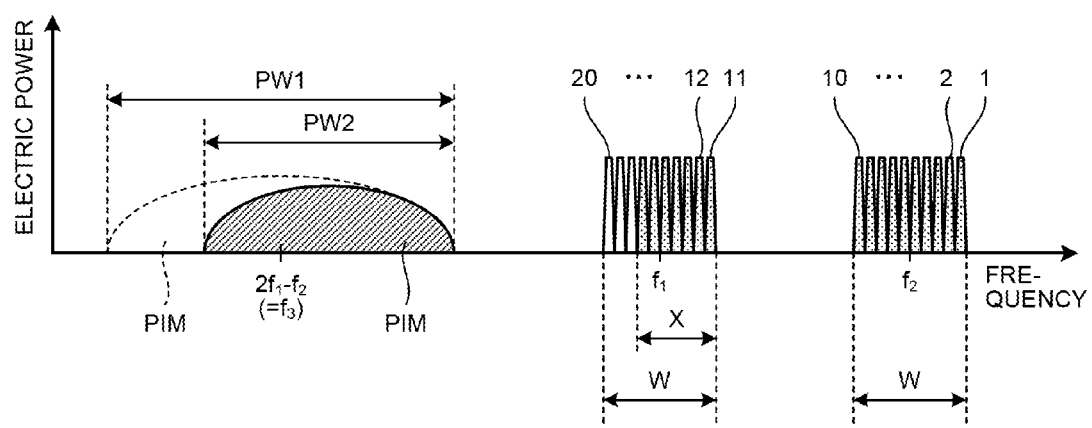
FIG. 7 is a diagram that illustrates the change of the carrier bandwidth by a transmission control unit according to the second embodiment.

FIG. 7 is a diagram that illustrates the change of the carrier bandwidth by the transmission control unit according to the second embodiment. As illustrated in FIG. 7, the carrier signal 1, i.e., the signal at the carrier frequency $f_1$, and the carrier signal 2, i.e., the signal at the carrier frequency $f_2$, are adjacent to each other in the multicarrier signal. Furthermore, both the carrier signal 1 and the carrier signal 2 have a carrier bandwidth W. Furthermore, "$2f_1-f_2$", which is the PIM frequency, and the reception frequency $f_3$ are overlapped, and the PIM correlation value is equal to or more than the threshold. Moreover, the bandwidth that is used to transmit the multicarrier signal is W+X (<2W). Here, the transmission control unit 111 changes the carrier bandwidth of the signal at the carrier frequency $f_1$, which is closer to "$2f_1-f_2$", among the carrier signals 1 and 2, i.e., the carrier bandwidth of the carrier signal 1, to a bandwidth "X" that is narrower than the carrier bandwidth "W" of the carrier signal 2. For example, the transmission control unit 111 selects the frequency to be used and changes the bandwidth in order from the maximum frequency in the carrier bandwidth "W" of the carrier signal 2, i.e., "$f_2+W/2$", to the minimum frequency in the carrier bandwidth "W" of the carrier signal 1, i.e., "$f_1-W/2$".

Thus, the carrier bandwidth of the carrier signal 1 is changed from "W" to "X", and the bandwidth of the PIM, which occurs in the signal that is received from the terminal 2, is changed from "PW1" to "PW2" that is narrower than "PW1".

Figure 8:
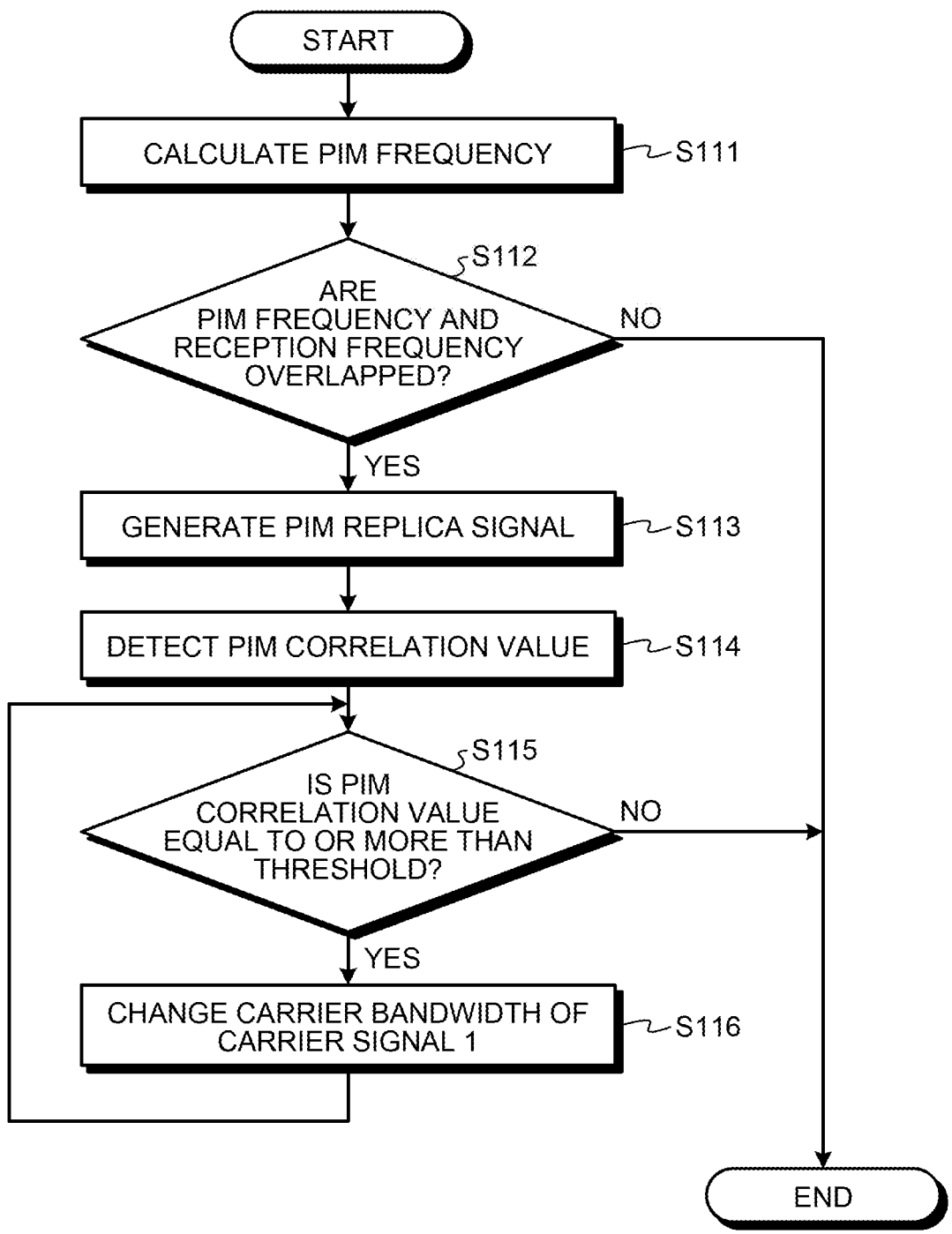
FIG. 8 is a flowchart that illustrates the processing procedure of the base station according to the second embodiment.

Next, an explanation is given of the processing procedure of the base station 100 according to the second embodiment. FIG. 8 is a flowchart that illustrates the processing procedure of the base station according to the second embodiment.

As illustrated in FIG. 8, the PIM-frequency calculating unit 21 of the PIM checking unit 112 calculates the PIM frequency (S111). The comparing unit 22 determines whether the PIM frequency and the reception frequency $f_3$ are overlapped (S112). If the PIM frequency and the reception frequency $f_3$ are not overlapped (No at S112), the comparing unit 22 terminates the operation.

If the PIM frequency and the reception frequency $f_3$ are overlapped as the result of determination by the comparing unit 22 (Yes at S112), the PIM replica-signal generating unit 23 generates a PIM replica signal (S113).

The correlation-value detecting unit 24 detects the correlation value between the PIM replica signal and the reception signal, i.e., the PIM correlation value (S114).

The transmission control unit 111 determines whether the PIM correlation value is equal to or more than the predetermined threshold (S115). If the PIM correlation value is less than the threshold (No at S115), the transmission control unit 111 terminates the operation.

If the PIM correlation value is equal to or more than the threshold (Yes at S115), the transmission control unit 111 changes the carrier bandwidth of the carrier signal 1, which is closer to the PIM frequency, among the carrier signals 1 and 2 to a bandwidth that is narrower than the carrier bandwidth of the carrier signal 2 (S116).

As described above, according to the present embodiment, if the PIM correlation value is equal to or more than the threshold, the base station 100 changes the carrier bandwidth of one of the carrier signals 1 and 2, which are adjacent to each other in the multicarrier signal, to a bandwidth that is narrower than the carrier bandwidth of the other one of the signals.

As the above configuration of the base station 100 makes narrower the bandwidth of the PIM, which occurs in the signal that is received from the terminal 2 due to the transmission of the multicarrier signal, degradation of the SIR due to the PIM is reduced. As a result, there is an improvement in the accuracy with which the reception control unit 17 controls the transmission power of the terminal 2, and therefore an increase in the power consumption of the terminal 2 is prevented.

[c] Third Embodiment

According to a third embodiment, if the PIM correlation value is equal to or more than the threshold, the transmission powers of multiple channels, assigned to each signal that is included in the multicarrier signal, are individually reduced.

Figure 9:
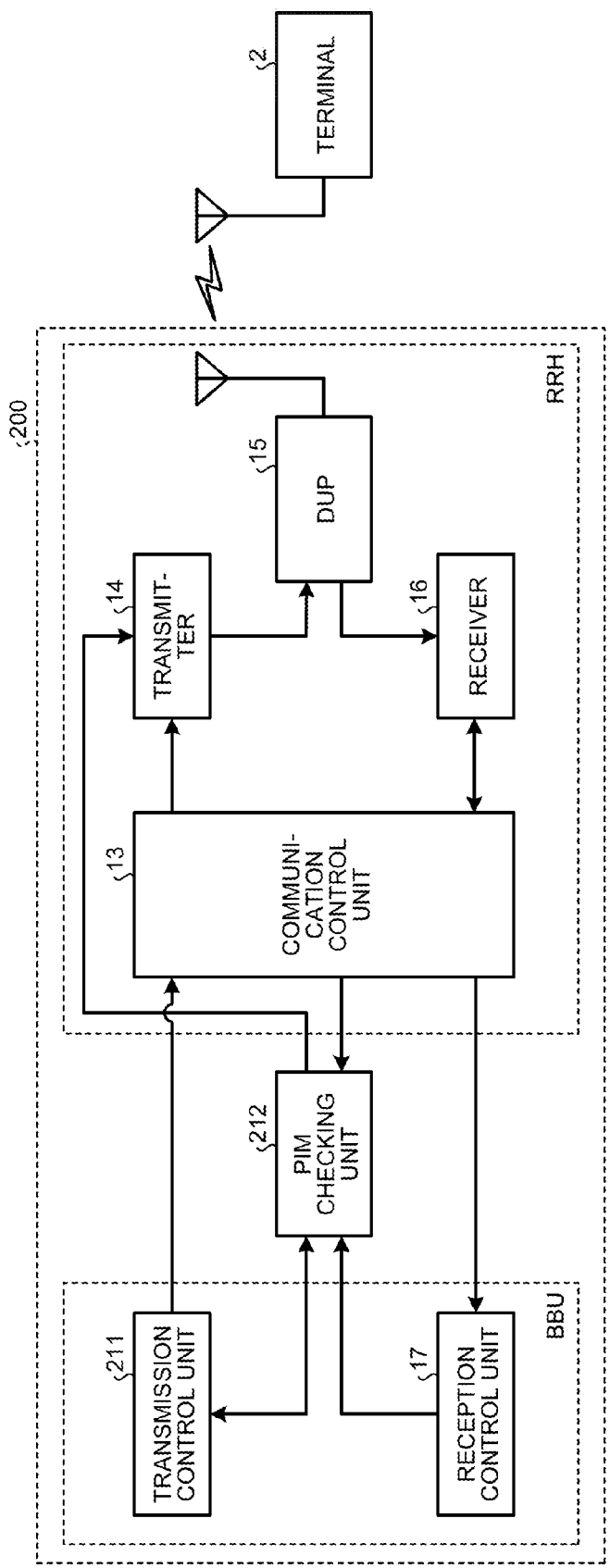
FIG. 9 is a block diagram that illustrates an example of the configuration of a wireless communication system according to a third embodiment.

FIG. 9 is a block diagram that illustrates an example of the configuration of a wireless communication system according to the third embodiment. In the wireless communication system, illustrated in FIG. 9, a base station 200 includes a PIM checking unit 212 instead of the PIM checking unit 12 that is illustrated in FIG. 1. Furthermore, the base station 200 includes a transmission control unit 211 instead of the transmission control unit 11 that is illustrated in FIG. 1.

The PIM checking unit 212 basically has the same function as that of the PIM checking unit 12 according to the first embodiment. That is, the PIM checking unit 212 includes the PIM-frequency calculating unit 21, the comparing unit 22, the PIM replica-signal generating unit 23, and the correlation-value detecting unit 24, illustrated in FIG. 2. Furthermore, the PIM-frequency calculating unit 21 outputs the calculated PIM frequency to the comparing unit 22 and the transmission control unit 211. Furthermore, the correlation-value detecting unit 24 outputs the detected PIM correlation value to the transmitter 14 and the transmission control unit 211.

The transmission control unit 211 basically has the same function as that of the transmission control unit 11 according to the first embodiment. Furthermore, the transmission control unit 211 determines whether the PIM correlation value, received from the PIM checking unit 212, is equal to or more than the predetermined threshold. Moreover, if the PIM correlation value is equal to or more than the threshold, the transmission control unit 211 individually reduces the transmission powers of multiple channels, assigned to each of the carrier signals 1 and 2.

Figure 10:
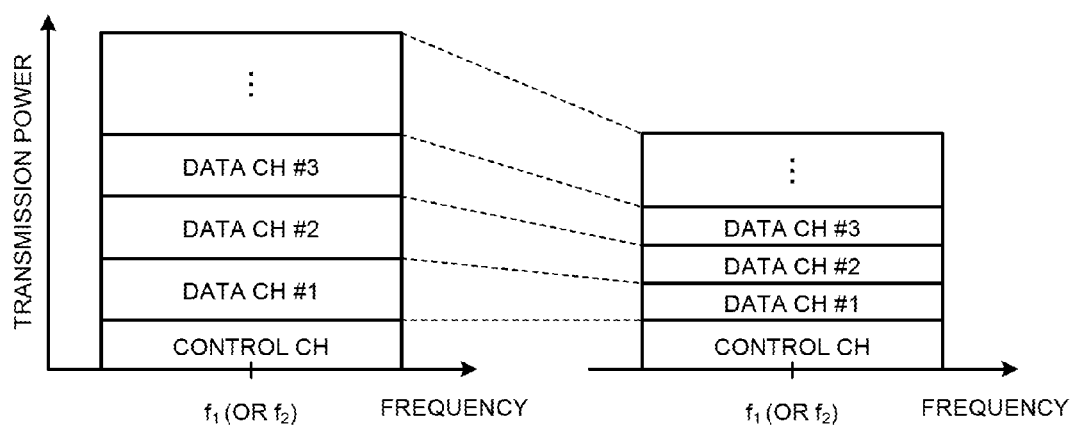
FIG. 10 is a diagram (1) that illustrates reduction of the transmission power by a transmission control unit according to the third embodiment.

FIG. 10 is a diagram (1) that illustrates reduction of the transmission power by the transmission control unit according to the third embodiment. In the example of FIG. 10, it is assumed that "$2f_1-f_2$", which is the PIM frequency, and the reception frequency $f_3$ are overlapped and the PIM correlation value is equal to or more than the threshold. In this case, the transmission control unit 211 reduces the transmission powers of multiple channels, assigned to each of the carrier signals 1 and 2, by a predetermined value in a uniform way. For example, as illustrated in FIG. 10, the transmission control unit 211 reduces the transmission powers of data channels #1 to #3, assigned to each of the carrier signals 1 and 2, by a predetermined value in a uniform way. Here, the transmission control unit 211 keeps the current value of the transmission power of a control channel that affects the range of cells of the base station 200.

Thus, the transmission powers of the data channels #1 to #3, assigned to each of the carrier signals 1 and 2, are reduced, and the level of the PIM, which occurs in the signal received from the terminal 2, is decreased.

Furthermore, in the case that is illustrated in the example of FIG. 10, the transmission control unit 211 reduces the transmission powers of multiple channels, assigned to each of the carrier signals 1 and 2, in a uniform way; however, this is not a limitation on the disclosed technology. For example, the transmission control unit 211 may also individually reduce the transmission powers of multiple channels, assigned to the signal at the carrier frequency that is closer to the PIM frequency among the carrier signals 1 and 2.

Figure 11:
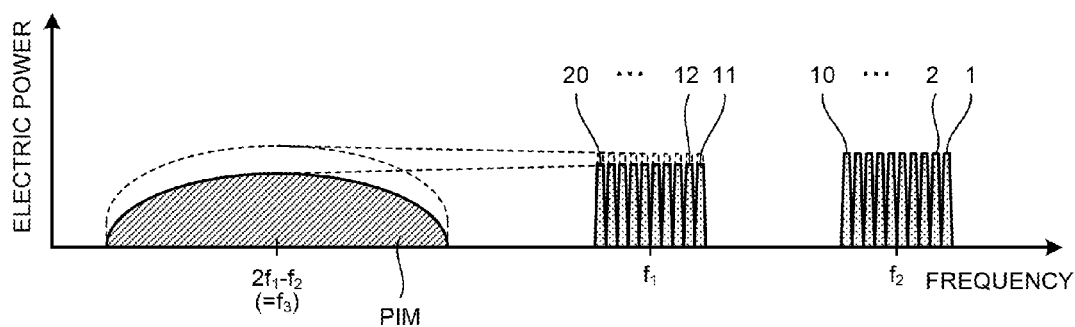
FIG. 11 is a diagram (2) that illustrates reduction of the transmission power by the transmission control unit according to the third embodiment.

FIG. 11 is a diagram (2) that illustrates reduction of the transmission power by the transmission control unit according to the third embodiment. In FIG. 11, the carrier signal 1, i.e., the signal at the carrier frequency $f_1$, and the carrier signal 2, i.e., the signal at the carrier frequency $f_2$, are adjacent to each other in the multicarrier signal. Furthermore, it is assumed that "$2f_1-f_2$", which is the PIM frequency, and the reception frequency $f_3$ are overlapped and the PIM correlation value is equal to or more than the threshold. In this case, the transmission control unit 211 individually reduces the transmission powers of multiple channels, assigned to the carrier signal 1 that is closer to the PIM frequency among the carrier signals 1 and 2.

Thus, the transmission powers of multiple channels, assigned to the carrier signal 1, are reduced, and the level of the PIM, which occurs in the signal received from the terminal 2, is decreased as indicated by the arrow in FIG. 11.

Furthermore, for example, the transmission control unit 211 may also individually reduce the transmission powers of multiple channels, assigned to the carrier signal 1, by updating the assignment of channels.

Figure 12:
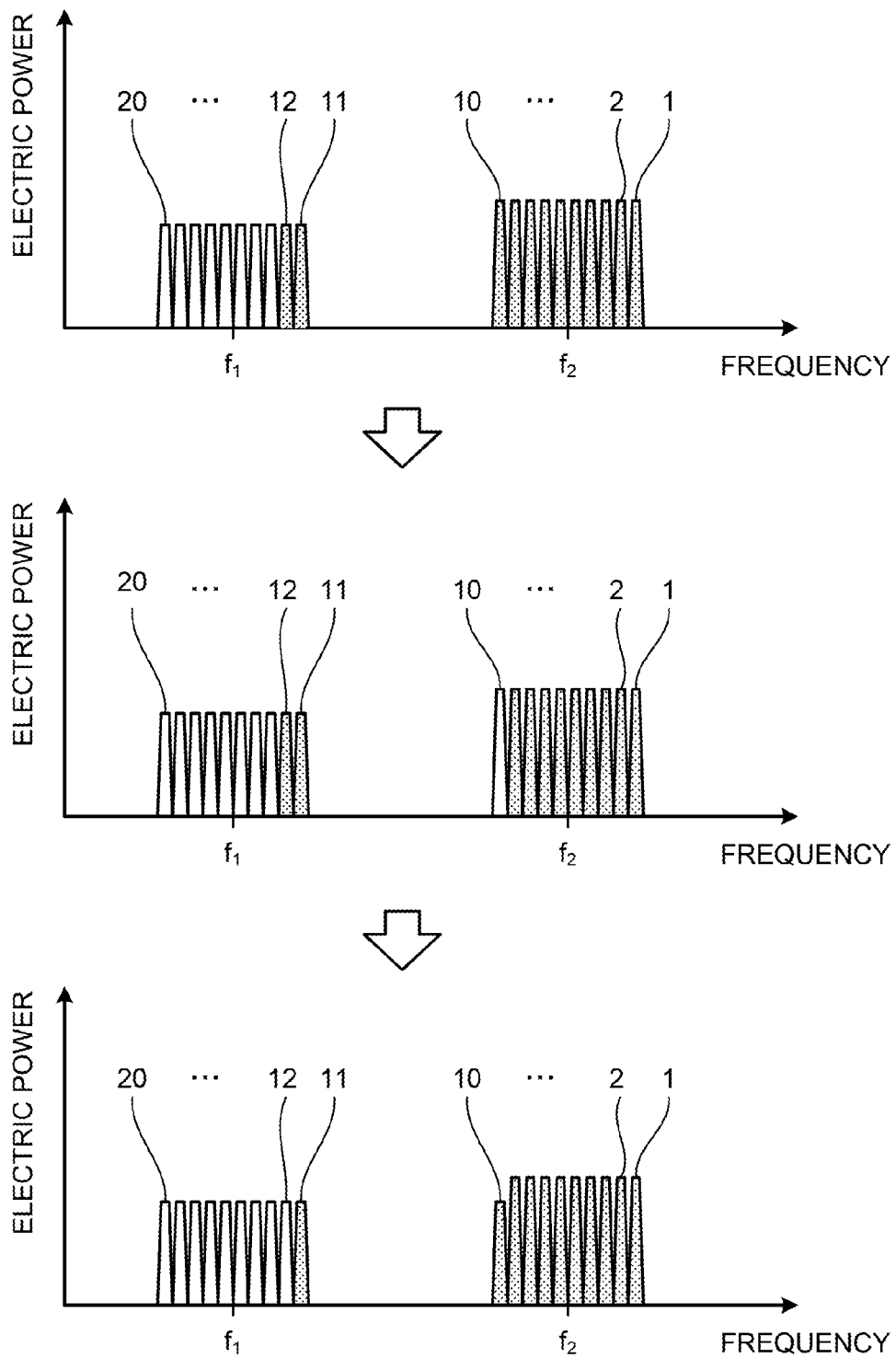
FIG. 12 is a diagram (3) that illustrates reduction of the transmission power by the transmission control unit according to the third embodiment.

FIG. 12 is a diagram (3) that illustrates reduction of the transmission power by the transmission control unit according to the third embodiment. In FIG. 12, the carrier signal 1, i.e., the signal at the carrier frequency $f_1$, and the carrier signal 2, i.e., the signal at the carrier frequency $f_2$, are adjacent to each other in the multicarrier signal. Furthermore, it is assumed that "$2f_1-f_2$", which is the PIM frequency, and the reception frequency $f_3$ are overlapped, and the PIM correlation value is equal to or more than the threshold. Furthermore, as illustrated in the upper side of FIG. 12, channels (11) and (12) are assigned to the carrier signal 1, and channels (1) to (10) are assigned to the carrier signal 2. Under this condition, if the channel (10) enters an empty state among the channels (1) to (10) in accordance with the movement of the terminal, as illustrated in the middle of FIG. 12, the transmission control unit 211 performs the following operation. Specifically, as illustrated in the downside of FIG. 12, the transmission control unit 211 updates the channel (12), which is closer to the PIM frequency among the channels (11) and (12), to the channel (10) so as to reduce the transmission powers of multiple channels that are assigned to the carrier signal 1.

Thus, the transmission powers of multiple channels, assigned to the carrier signal 1, are reduced, and the level of PIM, which occurs in the signal received from the terminal 2, is decreased.

Figure 13:
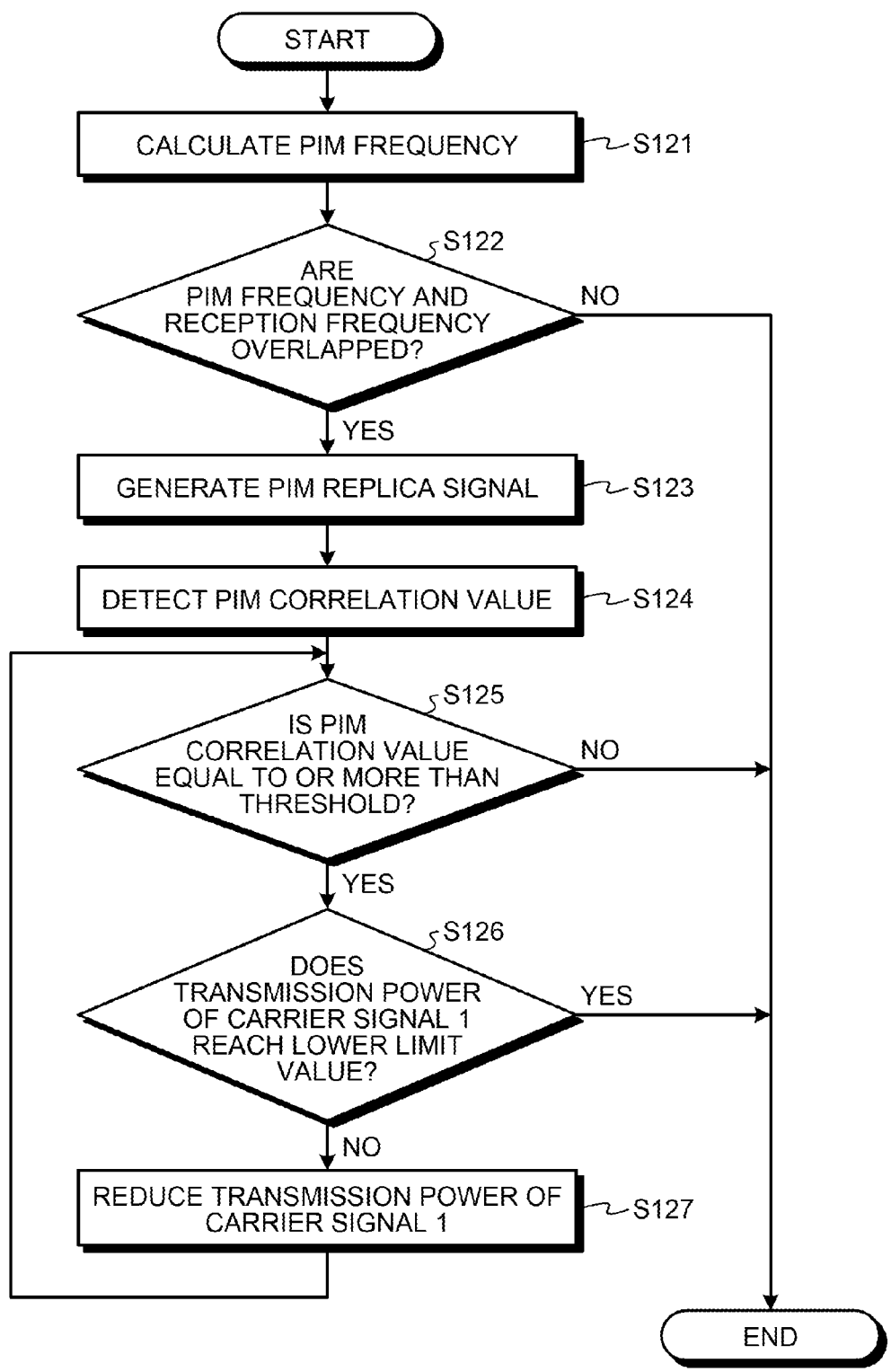
FIG. 13 is a flowchart that illustrates the processing procedure of the base station according to the third embodiment.

Next, an explanation is given of the processing procedure of the base station 200 according to the third embodiment. FIG. 13 is a flowchart that illustrates the processing procedure of the base station according to the third embodiment.

As illustrated in FIG. 13, the PIM-frequency calculating unit 21 of the PIM checking unit 212 calculates the PIM frequency (S121). The comparing unit 22 determines whether the PIM frequency and the reception frequency $f_3$ are overlapped (S122). If the PIM frequency and the reception frequency $f_3$ are not overlapped (No at S122), the comparing unit 22 terminates the operation.

If the PIM frequency and the reception frequency $f_3$ are overlapped as the result of determination by the comparing unit 22 (Yes at S122), the PIM replica-signal generating unit 23 generates a PIM replica signal (S123).

The correlation-value detecting unit 24 detects the correlation value between the PIM replica signal and the reception signal, i.e., the PIM correlation value (S124).

The transmission control unit 211 determines whether the PIM correlation value is equal to or more than the predetermined threshold (S125). If the PIM correlation value is less than the threshold (No at S125), the transmission control unit 211 terminates the operation.

If the PIM correlation value is equal to or more than the threshold (Yes at S125), the transmission control unit 211 determines whether the transmission powers of multiple channels, assigned to the carrier signal 1 that is closer to the PIM frequency among the carrier signals 1 and 2, reach the predetermined lower limit value (S126). If the transmission powers of multiple channels, assigned to the carrier signal 1, reach the predetermined lower limit value (Yes at S126), the transmission control unit 211 terminates the operation.

If the transmission powers of multiple channels, assigned to the carrier signal 1, do not reach the predetermined lower limit value (No at S126), the transmission control unit 211 individually reduces the transmission powers of multiple channels, assigned to the carrier signal 1 (S127) and returns to the operation at Step S125. That is, if the PIM correlation value is equal to or more than the threshold, the transmission control unit 211 gradually reduces the transmission powers of multiple channels until the PIM correlation value becomes less than the threshold or until the transmission powers of multiple channels, assigned to the carrier signal 1, reach the lower limit value.

As described above, according to the present embodiment, if the PIM correlation value is equal to or more than the threshold, the base station 200 individually reduces the transmission powers of multiple channels, which are assigned to each signal, included in the multicarrier signal.

As the above configuration of the base station 200 reduces the level of the PIM, which occurs in the signal that is received from the terminal 2 due to the transmission of the multicarrier signal, degradation of the SIR due to the PIM is reduced. As a result, there is an improvement in the accuracy with which the reception control unit 17 controls the transmission power of the terminal 2, and therefore an increase in the power consumption of the terminal 2 is prevented.

[d] Forth Embodiment

According to a fourth embodiment, if the PIM correlation value is equal to or more than the threshold, the frequency to be used for receiving the reception signal is selected in order from the frequency that is farthest from the PIM frequency to the closest frequency in the predetermined reception band.

Figure 14:
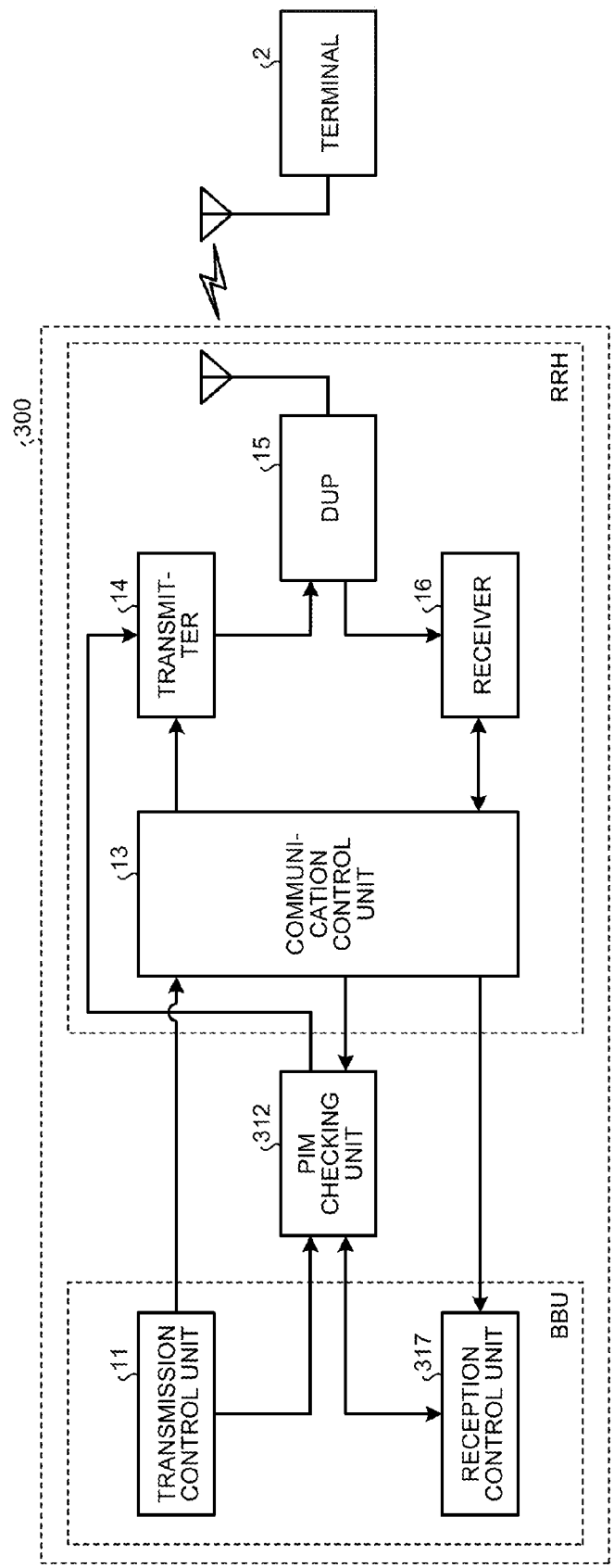
FIG. 14 is a block diagram that illustrates an example of the configuration of a wireless communication system according to a fourth embodiment.

FIG. 14 is a block diagram that illustrates an example of the configuration of a wireless communication system according to the fourth embodiment. In the wireless communication system, illustrated in FIG. 14, a base station 300 includes a PIM checking unit 312 instead of the PIM checking unit 12 that is illustrated in FIG. 1. Furthermore, the base station 300 includes a reception control unit 317 instead of the reception control unit 17 that is illustrated in FIG. 1.

The PIM checking unit 312 basically has the same function as that of the PIM checking unit 12 according to the first embodiment. That is, the PIM checking unit 312 includes the PIM-frequency calculating unit 21, the comparing unit 22, the PIM replica-signal generating unit 23, and the correlation-value detecting unit 24, illustrated in FIG. 2. Furthermore, the PIM-frequency calculating unit 21 outputs the calculated PIM frequency to the comparing unit 22 and the reception control unit 317. Furthermore, the correlation-value detecting unit 24 outputs the detected PIM correlation value to the transmitter 14 and the reception control unit 317.

The reception control unit 317 basically has the same function as that of the reception control unit 17 according to the first embodiment. Furthermore, the reception control unit 317 determines whether the PIM correlation value, received from the PIM checking unit 312, is equal to or more than the predetermined threshold. Furthermore, if the PIM correlation value is equal to or more than the threshold, the reception control unit 317 selects the frequency to be used for receiving the reception signal in order from the frequency that is farthest from the PIM frequency to the closest frequency in the predetermined reception band.

Figure 15:
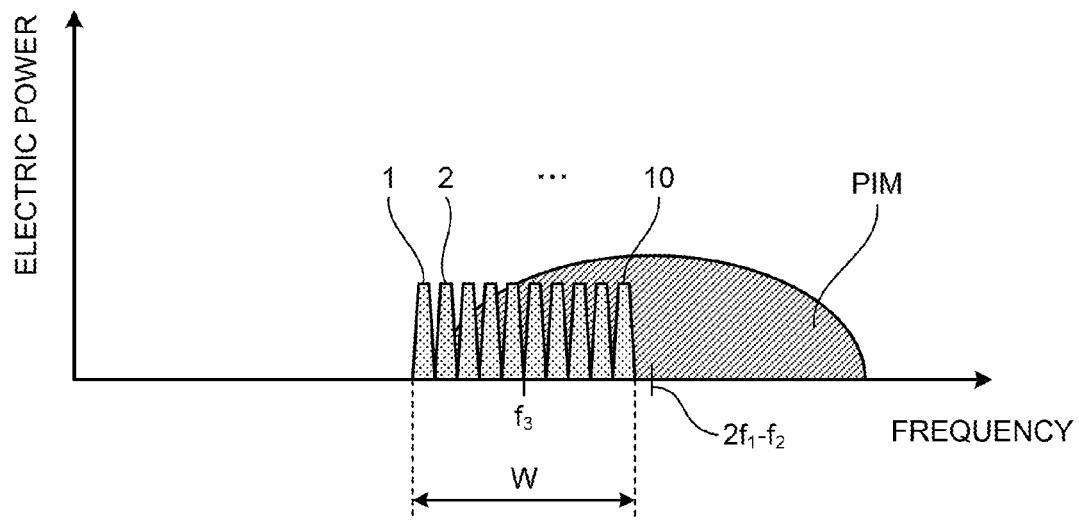
FIG. 15 is a diagram (1) that illustrates selection of the frequency by a reception control unit according to the fourth embodiment.

FIG. 15 is a diagram (1) that illustrates selection of the frequency by the reception control unit according to the fourth embodiment. In FIG. 15, the carrier signal 1, i.e., the signal at the carrier frequency $f_1$, and the carrier signal 2, i.e., the signal at the carrier frequency $f_2$, are adjacent to each other in the multicarrier signal. Furthermore, in FIG. 15, "$2f_1-f_2$", which is the PIM frequency, and the reception frequency $f_3$ are overlapped, and the PIM correlation value is equal to or more than the threshold. Furthermore, in FIG. 15, in order to receive the reception signal from the terminal 2, the center frequency is the reception frequency $f_3$, and the reception band having the bandwidth W is previously defined. Moreover, in FIG. 15, the interval between the PIM frequency "$2f_1-f_2$" and the reception frequency $f_3$ along the frequency axis is less than a predetermined value. Under this condition, the reception control unit 317 selects the frequency to be used for receiving the reception signal in order from the frequency that is farthest from the PIM frequency "$2f_1-f_2$" to the closest frequency in the predetermined reception band. In the example of FIG. 15, in the previously defined reception band, the frequency that is farthest from the PIM frequency "$2f_1-f_2$" is "$f_3-W/2$", and the frequency that is closest to the PIM frequency "$2f_1-f_2$" is "$f_3+W/2$". Therefore, the reception control unit 317 selects the frequency to be used for receiving the reception signal in order from "$f_3-W/2$" to "$f_3+W/2$".

Thus, it is possible to select the frequency to be used for receiving the reception signal while avoiding the frequency that has a high level of PIM as much as possible.

Figure 16:
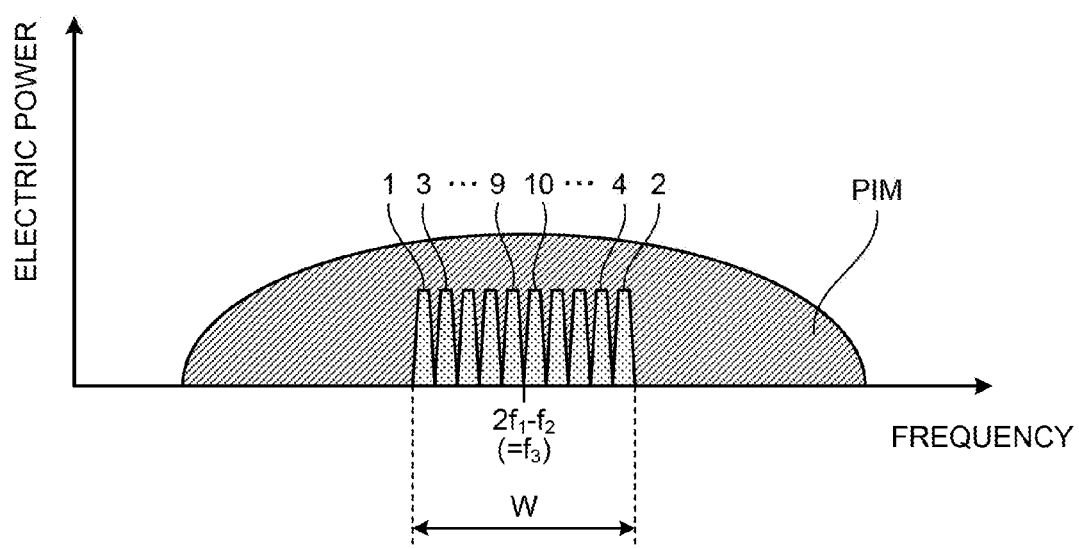
FIG. 16 is a diagram (2) that illustrates selection of the frequency by the reception control unit according to the fourth embodiment.

FIG. 16 is a diagram (2) that illustrates selection of the frequency by the reception control unit according to the fourth embodiment. In FIG. 16, the carrier signal 1, i.e., the signal at the carrier frequency $f_1$, and the carrier signal 2, i.e., the signal at the carrier frequency $f_2$, are adjacent to each other in the multicarrier signal. Furthermore, in FIG. 16, "$2f_1-f_2$", which is the PIM frequency, and the reception frequency $f_3$ are overlapped, and the PIM correlation value is equal to or more than the threshold. Furthermore, in FIG. 16, in order to receive the reception signal from the terminal 2, the center frequency is the reception frequency $f_3$, and the reception band having the bandwidth W is previously defined. Moreover, in FIG. 16, the PIM frequency "$2f_1-f_2$" and the reception frequency $f_3$ completely match. Under this condition, the reception control unit 317 selects the frequency to be used for receiving the reception signal in order from the frequency that is farthest from the PIM frequency "$2f_1-f_2$" to the closest frequency in the predetermined reception band. In the example of FIG. 16, in the previously defined reception band, the frequency that is farthest from the PIM frequency "$2f_1-f_2$" is "$f_3-W/2$" or "$f_3+W/2$", and the frequency that is closest to the PIM frequency "$2f_1-f_2$" is "$f_3$". Therefore, the reception control unit 317 selects the frequency to be used for receiving the reception signal in order from "$f_3-W/2$" or "$f_3+W/2$" to "$f_3$".

Thus, it is possible to select the frequency to be used for receiving the reception signal while avoiding the frequency that has a high level of PIM as much as possible.

Figure 17:
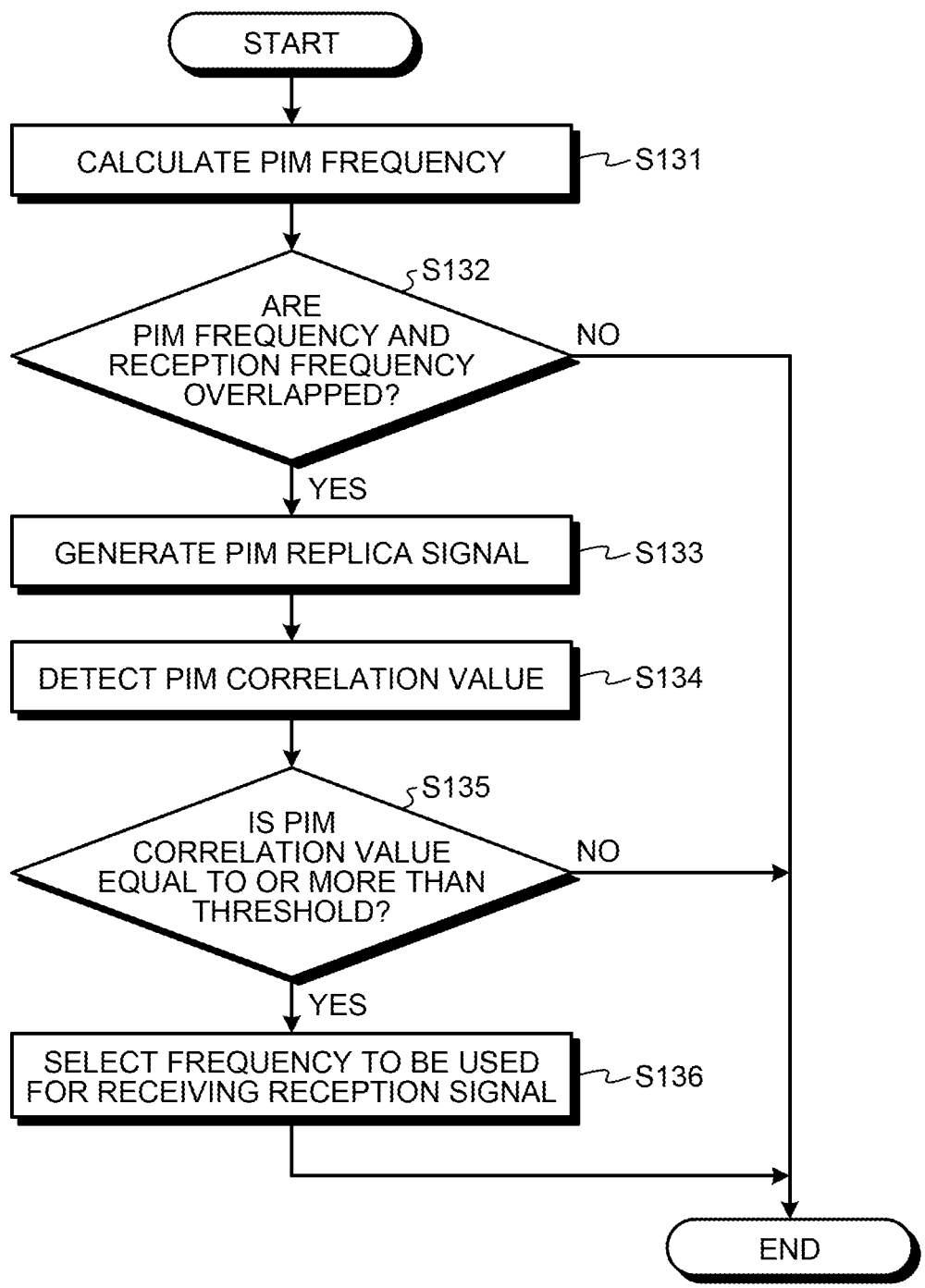
FIG. 17 is a flowchart that illustrates the processing procedure of the base station according to the fourth embodiment.

Next, an explanation is given of the processing procedure of the base station 300 according to the fourth embodiment. FIG. 17 is a flowchart that illustrates the processing procedure of the base station according to the fourth embodiment.

As illustrated in FIG. 17, the PIM-frequency calculating unit 21 of the PIM checking unit 312 calculates the PIM frequency (S131). The comparing unit 22 determines whether the PIM frequency and the reception frequency $f_3$ are overlapped (S132). If the PIM frequency and the reception frequency $f_3$ are not overlapped (No at S132), the comparing unit 22 terminates the operation.

If the PIM frequency and the reception frequency $f_3$ are overlapped as the result of determination by the comparing unit 22 (Yes at S132), the PIM replica-signal generating unit 23 generates a PIM replica signal (S133).

The correlation-value detecting unit 24 detects the correlation value between the PIM replica signal and the reception signal, i.e., the PIM correlation value (S134).

The reception control unit 317 determines whether the PIM correlation value is equal to or more than the predetermined threshold (S135). If the PIM correlation value is less than the threshold (No at S135), the reception control unit 317 terminates the operation.

If the PIM correlation value is equal to or more than the threshold (Yes at S135), the reception control unit 317 selects the frequency to be used for receiving the reception signal in order from the frequency that is farthest from the PIM frequency to the closest frequency in the predetermined reception band (S136).

As described above, according to the present embodiment, if the PIM correlation value is equal to or more than the threshold, the base station 300 selects the frequency to be used for receiving the reception signal in order from the frequency that is farthest from the PIM frequency to the closest frequency in the predetermined reception band.

With the configuration of the base station 300, it is possible to select the frequency to be used for receiving the reception signal while avoiding the frequency that has a high level of PIM as much as possible; thus, degradation of the SIR, caused by the PIM, may be reduced. As a result, there is an improvement in the accuracy with which the reception control unit 17 controls the transmission power of the terminal 2, and therefore an increase in the power consumption of the terminal 2 is prevented.

[e] Other Embodiments

Components of each unit, illustrated in the above-described embodiments, do not need to be physically configured as illustrated in the drawings. Specifically, specific forms of separation and combination of each unit are not limited to those depicted in the drawings, and a configuration may be such that all or some of them are functionally or physically separated or combined in an arbitrary unit depending on various types of loads or usage.

Furthermore, all or any of various processing functions, performed by each device, may be implemented by a central processing unit (CPU) (or a microcomputer such as a micro processing unit (MPU), or micro controller unit (MCU)). Moreover, all or any of the various processing functions may be implemented by programs that are analyzed and executed by a CPU (or a microcomputer such as an MPU or MCU) or by wired logic hardware.

Furthermore, the first embodiment to the fourth embodiment, which are described above, illustrate the cases where suppression of the peak of the multicarrier signal, change of the carrier bandwidth, reduction of the transmission power, and selection of the frequency to be used for receiving a reception signal are separately conducted; however, the embodiments may also be implemented in combination.

Moreover, the first embodiment to the fourth embodiment, which are described above, illustrate the cases where the PIM checking units 12, 112, 212, and 312 are provided between the BBU and the RRH; however, this is not a limitation on the disclosed technology. For example, the PIM checking unit may be housed in the BBU or the RRH.

According to an aspect of the wireless communication apparatus, disclosed in the subject application, there is an advantage such that it is possible to prevent degradation of the reception quality due to passive inter modulation distortion.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless communication apparatus comprising:
a processor configured to:
generate, using signals at multiple carrier frequencies that are different from each other, a replica signal for passive inter modulation distortion that occurs in a reception signal from a terminal due to transmission of a multicarrier signal that includes the signals at the multiple carrier frequencies;
detect a correlation value between the replica signal for the passive inter modulation distortion and the reception signal; and
suppress a peak of the multicarrier signal when the correlation value is equal to or more than a threshold.

2. The wireless communication apparatus according to claim 1, wherein, the processor is further configured to gradually suppress, when the correlation value is equal to or more than the threshold, the peak of the multicarrier signal until the correlation value becomes less than the threshold or until a value of the peak of the multicarrier signal, whose peak has been suppressed, reaches a predetermined lower limit value.

3. The wireless communication apparatus according to claim 1, the processor is further configured to change, when the correlation value is equal to or more than the threshold, a carrier bandwidth of one of signals at two carrier frequencies, which are adjacent to each other in the multicarrier signal, to a bandwidth that is narrower than a carrier bandwidth of other one of the signals at the two carrier frequencies.

4. The wireless communication apparatus according to claim 3, wherein, the processor is further configured to change a carrier bandwidth of a signal at a carrier frequency, which is closer to a frequency of the passive inter modulation distortion, among the signals at the two carrier frequencies, to a bandwidth that is narrower than a carrier bandwidth of other one of the signals at the two carrier frequencies.

5. The wireless communication apparatus according to claim 1, the processor is further configured to reduce, when the correlation value is equal to or more than the threshold, transmission powers of multiple channels that are assigned to a signal at each of the multiple carrier frequencies, included in the multicarrier signal.

6. The wireless communication apparatus according to claim 5, wherein, the processor is further configured to individually reduce transmission powers of multiple channels that are assigned to a signal at a carrier frequency that is closer to the frequency of the passive inter modulation distortion, among signals at two carrier frequencies, which are adjacent to each other in the multicarrier signal.

7. The wireless communication apparatus according to claim 1, the processor is further configured to select, when the correlation value is equal to or more than the threshold, a frequency to be used for receiving the reception signal in order from a frequency that is farthest from the frequency of the passive inter modulation distortion to a closest frequency in a predetermined reception band.

8. A wireless communication apparatus comprising:
a processor configured to:
generate, using signals at multiple carrier frequencies that are different from each other, a replica signal for passive inter modulation distortion that occurs in a reception signal from a terminal due to transmission of a multicarrier signal that includes the signals at the multiple carrier frequencies;
detect a correlation value between the replica signal for the passive inter modulation distortion and the reception signal; and
change, when the correlation value is equal to or more than the threshold, a carrier bandwidth of one of signals at two carrier frequencies, which are adjacent to each other in the multicarrier signal, to a bandwidth that is narrower than a carrier bandwidth of other one of the signals at the two carrier frequencies.

* * * * *